United States Patent
Zhao et al.

(10) Patent No.: US 12,067,595 B2
(45) Date of Patent: Aug. 20, 2024

(54) BEHAVIOR SHIFT-BASED INTEREST LEVEL PREDICTION

(71) Applicant: Samsung Electronics Co., Ltd., Suwon-si (KR)

(72) Inventors: Xiangyuan Zhao, Irvine, CA (US); Yingnan Zhu, Irvine, CA (US); Hong-Hoe Kim, Aliso Viejo, CA (US); Tomasz J. Palczewski, Danville, CA (US); Anirudh Rao, San Jose, CA (US); Hari Babu Nayar, Hayward, CA (US); Chaitanya Praveen Pratury, Mountain House, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/057,649

(22) Filed: Nov. 21, 2022

(65) Prior Publication Data
US 2024/0169396 A1    May 23, 2024

(51) Int. Cl.
*G06Q 30/02* (2023.01)
*G06Q 30/0251* (2023.01)
*H04N 21/466* (2011.01)

(52) U.S. Cl.
CPC ..... *G06Q 30/0264* (2013.01); *H04N 21/4667* (2013.01); *H04N 21/4668* (2013.01)

(58) Field of Classification Search
CPC ........... G06Q 30/0264; H04N 21/4667; H04N 21/4668
See application file for complete search history.

(56) References Cited

U.S. PATENT DOCUMENTS

| | | | |
|---|---|---|---|
| 8,789,083 B1 * | 7/2014 | Landers | H04N 21/812 725/16 |
| 10,586,572 B2 | 3/2020 | Olsen et al. | |
| 10,708,654 B1 * | 7/2020 | Moraghan | H04N 21/4532 |
| 10,817,791 B1 | 10/2020 | Shoemaker et al. | |

(Continued)

FOREIGN PATENT DOCUMENTS

| | | | | |
|---|---|---|---|---|
| CN | 110162553 A | * | 8/2019 | ........ G06F 16/2458 |
| JP | 5615857 B2 | | 10/2014 | |

(Continued)

OTHER PUBLICATIONS

Langley et al., Approaches to Machine Learning, Feb. 16, 1984, Journal of the American Society for Information Sciences, pp. 1-28 (Year: 1984).*

(Continued)

*Primary Examiner* — John Van Bramer

(57) ABSTRACT

A method includes providing a Fibonacci confidence interval level on user program viewership data to distinguish user interest level in different linear entertainment programs. The method also includes creating a behavior shift feature space for acquiring information about user behavior over time based on a behavior sequence, a first derivative on the behavior sequence, and a second derivative on the behavior sequence. The method further includes utilizing, based on a trained machine learning model, a transformer structure and attention to map user data from the behavior shift feature space into a prediction of the Fibonacci confidence interval level.

27 Claims, 10 Drawing Sheets

(56) References Cited

U.S. PATENT DOCUMENTS

| | | | |
|---|---|---|---|
| 2014/0081977 A1* | 3/2014 | Kapur | G06Q 30/0269 707/738 |
| 2021/0209624 A1* | 7/2021 | Maugans, III | G06Q 20/20 |
| 2021/0231449 A1 | 7/2021 | Hu et al. | |
| 2021/0374178 A1 | 12/2021 | Deng et al. | |
| 2022/0014820 A1 | 1/2022 | Hannes et al. | |

FOREIGN PATENT DOCUMENTS

| | | |
|---|---|---|
| KR | 102086248 B1 | 3/2020 |
| WO | 2020191282 A2 | 9/2020 |

OTHER PUBLICATIONS

Wang et al., Convolution-enhanced Evolving Attention Networks, Aug. 2015, Journal of Latex Class Files, vol. 14, No. 8, pp. 1-16 (Year: 2015).*

International Search Report and Written Opinion of the International Searching Authority dated Aug. 7, 2023 in connection with International Patent Application No. PCT/KR2023/005234, 9 pages.

Covington et al., "Deep Neural Networks for YouTube Recommendations", RecSys '16, Sep. 2016, 8 pages.

Zhou et al., "Deep Interest Network for Click-Through Rate Prediction", arXiv:1706.06978v4 [stat.ML], Sep. 2018, 9 pages.

Chen et al., "Behavior Sequence Transformer for E-commerce Recommendation in Alibaba", arXiv:1905.06874v1 [cs.IR], May 2019, 4 pages.

* cited by examiner

BEHAVIOR SHIFT-BASED INTEREST LEVEL PREDICTION

TECHNICAL FIELD

This disclosure relates generally to machine learning systems. More specifically, this disclosure relates to behavior shift-based interest level prediction.

BACKGROUND

A large amount of consumer behavior data is collected by consumer electronic devices. Use of this data to deliver meaningful experiences reaching the right audiences across televisions and mobile and desktop devices is addressed here.

SUMMARY

This disclosure relates to behavior shift-based interest level prediction.

In a first embodiment, a method includes providing a Fibonacci confidence interval level on user program viewership data to distinguish user interest level in different linear entertainment programs. The method also includes creating a behavior shift feature space for acquiring information about user behavior over time based on a behavior sequence, a first derivative on the behavior sequence, and a second derivative on the behavior sequence. The method further includes utilizing, based on a trained machine learning model, a transformer structure and attention to map user data from the behavior shift feature space into a prediction of the Fibonacci confidence interval level.

In a second embodiment, an apparatus includes at least one processing device configured to provide a Fibonacci confidence interval level on user program viewership data to distinguish user interest level in different linear entertainment programs. The at least one processing device is also configured to create a behavior shift feature space for acquiring information about user behavior over time based on a behavior sequence, a first derivative on the behavior sequence, and a second derivative on the behavior sequence. The at least one processing device is further configured to utilize, based on a trained machine learning model, a transformer structure and attention to map user data from the behavior shift feature space into a prediction of the Fibonacci confidence interval level.

In a third embodiment, a non-transitory computer readable medium contains instructions that when executed cause at least one processor to provide a Fibonacci confidence interval level on user program viewership data to distinguish user interest level in different linear entertainment programs. The instructions when executed also cause the at least one processor to create a behavior shift feature space for acquiring information about user behavior over time based on a behavior sequence, a first derivative on the behavior sequence, and a second derivative on the behavior sequence. The instructions when executed further cause the at least one processor to utilize, based on a trained machine learning model, a transformer structure and attention to map user data from the behavior shift feature space into a prediction of the Fibonacci confidence interval level.

In a fourth embodiment, a method includes receiving an advertising campaign request relating to a target linear entertainment program, season, or episode. The method also includes generating inference data based on a machine learning model trained using (i) a Fibonacci confidence interval level on user program viewership data to distinguish user interest level in different linear entertainment programs and (ii) a behavior shift feature space for acquiring information about user behavior over time based on a behavior sequence, a first derivative on the behavior sequence, and a second derivative on the behavior sequence. The method further includes determining, from the inference data, an inference regarding user interest level in the target linear entertainment program, season, or episode for one or more users.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(1) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
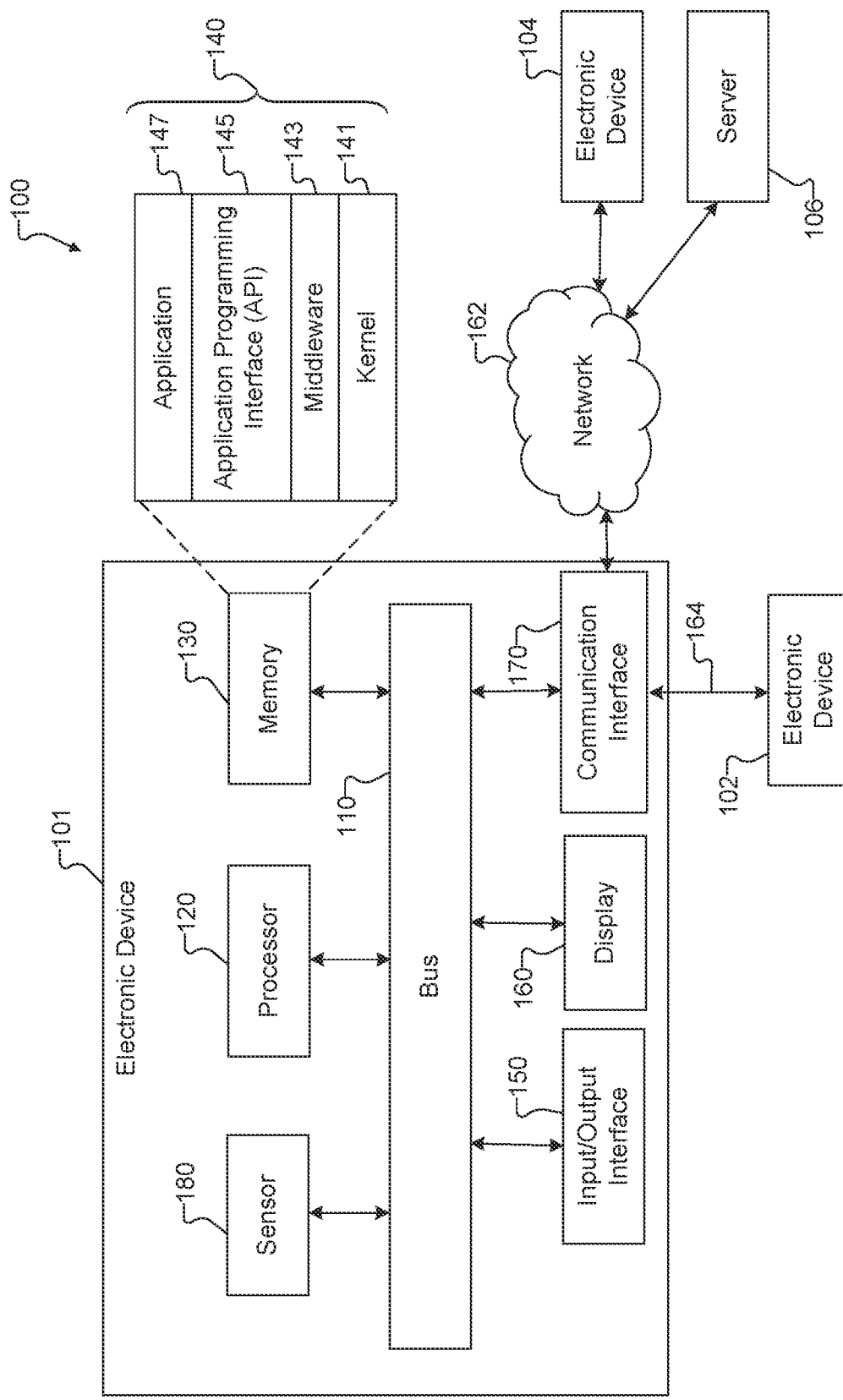
FIG. 1 illustrates an example network configuration including an electronic device according to this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

In this disclosure, a state-of-the-art behavior shift-based interest level prediction system is introduced to analyze data from smart devices. This system analyzes user behavior and finds accurate target users for advertisers that run campaigns on devices. The system has better performance than other systems for various reasons. For example, the system can provide target users and user interest levels based on the system's novel viewership-based Fibonacci confidence interval interest separation algorithm. The system can also run deep feature analysis using a novel machine learning model on a behavior shift feature space. The approaches in this disclosure may improve ad campaign performance compared to previous systems, possibly by a large margin. With a large dataset powered by automatic content recognition (ACR), combined with third-party data from trusted partners, the system may offer advertisers real-time entertainment viewing insights from numerous individuals, such as over 50 million users in the United States and possibly more than 200 million devices globally.

Current rule-based audience generation systems usually have poor performance, especially for cold start scenarios. Using a machine learning-based system, the present disclosure addresses various problems. For example, one common problem involves determining how to perform feature engineering for each campaign since campaigns on linear entertainment content typically have a cold start prediction. Unlike recommendation systems that typically try to recommend existing items (such as content or item to buy) to users, a tune-in prediction system recommends future programs to linear entertainment consumers. Therefore, tune-in campaign creation can be seen as a cold start prediction problem. In this case, using an embedding layer (as in most recommendation systems) is not a viable solution because (i) the embedding space would keep increasing and (ii) embedding can represent only existing items, not new ones.

Another common problem involves determining how to predict a user's interest level for a campaign program. For advertising, knowing a user's interest level for a campaign program can be important or crucial to running successful campaigns. Linear entertainment programs are not like other items since, in general, users might have some specific behavior that could affect campaign results. For example, some television shows have loyal fans that will tune in to a new season, no matter if advertising runs on their devices or not. Thus, from a results perspective, these users are already converted, and spending a campaign's budget on them is not efficient. Other common problems involve determining how to better capture a user's behavioral changes over time, determining how to construct an end-to-end system that can solve these types of problems, and determining how to accelerate the whole system's throughput to support as many campaigns as possible at the same time.

This disclosure solves the various problems mentioned above through the use of the machine learning-based system and other features of the described tune-in prediction systems. For example, an offline behavior data feature engineering pipeline can be designed to periodically (such as daily) aggregate users' behavior data and persist the features of the users' behavior into a behavior feature database. This process transfers raw behavior data into vectorized features, such as by using one or more trained algorithms with daily sessionization. The process may map all programs on linear entertainment into predefined feature spaces and solve the cold start problem. Since the behavior features can represent daily sessionized features, the behavior features can be used flexibly as needed or desired. The behavior features support feature engineering in different post-processing time windows (such as weekly, monthly, quarterly, etc.). General features can be generated daily or at other times and can be reused for different campaigns, which boosts the pipeline's running speed and reduces time and cost.

A Fibonacci confidence interval level on a user's program viewership data can be introduced to distinguish the user's interest level in different linear entertainment programs. The confidence interval level is flexible and can be scaled up according to the system's customer needs (such as an advertising customer). A behavior shift feature space can be designed that uses traditional behavior sequences (used in sequential machine learning structures to represent behavior changes as in many embedding layer-based recommendation systems) and that also introduces first and second derivatives of the behavior sequence. Use of the first and second derivatives of the behavior sequence, together with the behavior sequence itself, helps create a behavior shift feature space for the whole system in order to better understand user behavior over time. A deep learning model structure may use a transformer structure and attention to map user data from the behavior shift feature space into a Fibonacci confidence interval level prediction. A pipeline may be designed to move as many components to offline processing as possible to boost throughput of the system and support as many campaigns as possible at the same time.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to perform one or more functions related to behavior shift-based interest level prediction.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for performing one or more functions related to behavior shift-based interest level prediction. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th Generation (5G) wireless system, millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform one or more functions related to behavior shift-based interest level prediction.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
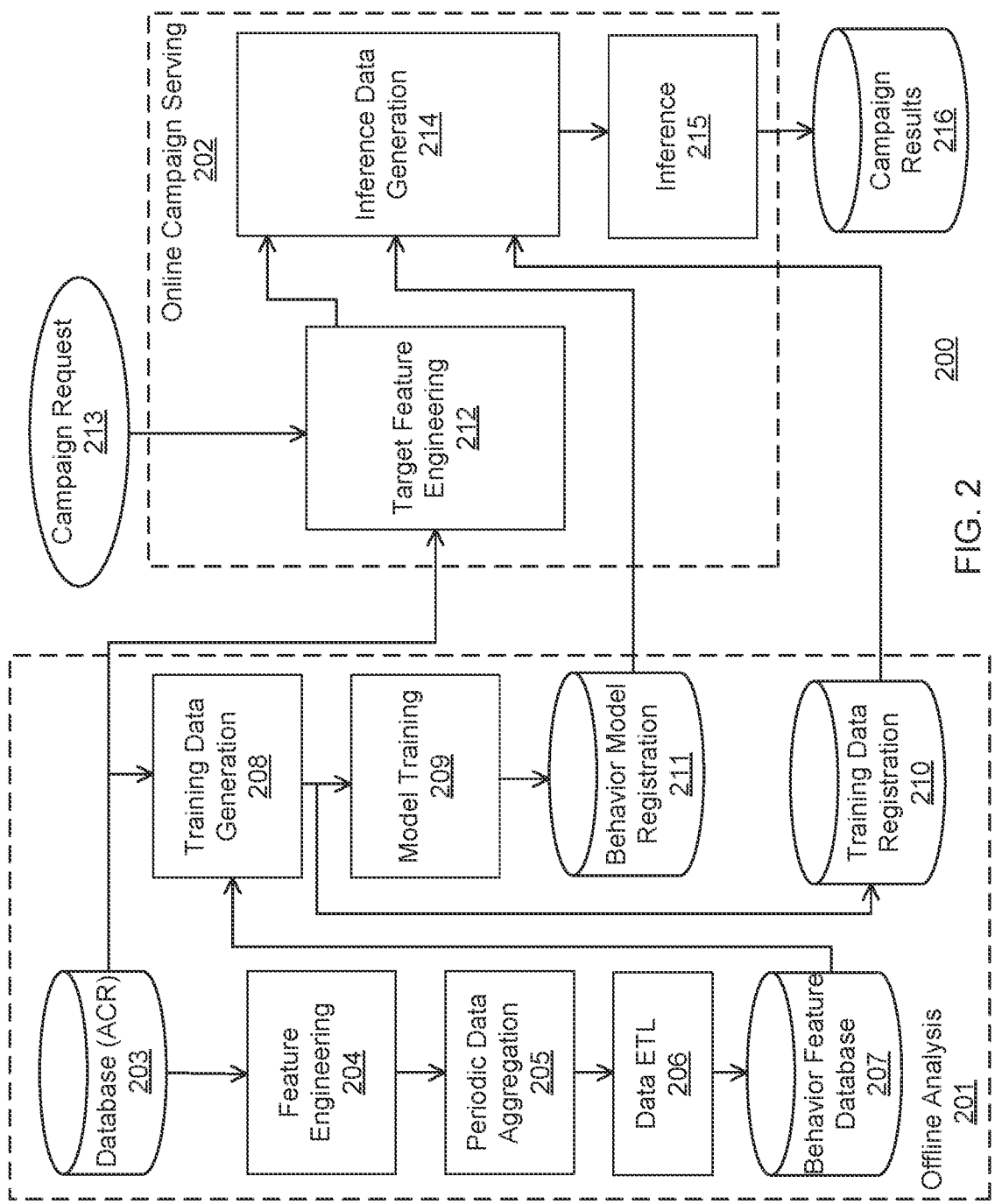
FIG. 2 illustrates an example system for behavior shift-based interest level prediction in accordance with this disclosure.

FIG. 2 illustrates an example system 200 for behavior shift-based interest level prediction in accordance with this disclosure. For ease of explanation, the system 200 shown in FIG. 2 is described as being implemented on or supported by one or more components in the network configuration 100 of FIG. 1, such as the server 106. However, the system 200 shown in FIG. 2 could be used with any other suitable device(s) and in any other suitable system(s).

As shown in FIG. 2, the system 200 includes an offline analysis subsystem 201 and an online campaign serving subsystem 202. The terms "offline" and "online" are simply meant to refer to different levels of data interaction with one or more user devices (such as the electronic device or devices 101, 102, 104) on which linear entertainment programming is consumed. In one example, the electronic device 101 may be a television, and the electronic device 102 may be a smart phone, both of which may be used by the same user to consume linear entertainment programming.

The offline analysis subsystem 201 includes a database 203 containing, for example, automatic content recognition (ACR) data reflecting consumption of linear entertainment programming by one or more users. Information from the database 203 is supplied to a feature engineering function 204, which determines the user behaviors of interest relating to consumed linear entertainment programs, such as time of day of viewed programs, title and/or genre of viewed programs, the duration of the program length viewed by the users, etc. The output from the feature engineering function 204 is supplied to a periodic data aggregation function 205, which aggregates the user behaviors on a periodic (such as daily) basis. A daily behavior data aggregation pipeline can be formed by the feature engineering function 204 and the periodic data aggregation function 205. Operation of the feature engineering function 204 and the periodic data aggregation function 205 are described further below. Aggregated data regarding the user's consumption of linear entertainment programming can be forwarded from the periodic data aggregation function 205 to a data extract, transform, and load (ETL) function 206, which operates to provide the aggregated user behavior information populating a behavior feature database 207. The behavior feature database 207 supplies user behavior data relating to linear entertainment programs to a training data generation function 208 as necessary for at least a determination of a Fibonacci confidence interval level of each user's interest in viewed programs and a behavior shift feature for each user relating to viewed programs. The behavior feature database 207 provides user behavior input including the Fibonacci confidence interval levels and behavior shift features to both a model training function 209 and a training data registration function 210. The model training function 209 trains a machine learning model and provides model data to a behavior model registration function 211.

Within the online campaign serving subsystem 202, a target feature engineering function 212 receives inputs from the database 203 and an advertising campaign request 213 and derives the features on which the trained machine learning model will operate to generate an inference. An inference data generation function 214 is based on inputs regarding those features from the target feature engineering function 212, as well as the machine learning model defined by the behavior model registration function 211, and user behavior information from the training data registration function 210, and generates an inference 215. The inference data generation function 214 exploits the Fibonacci confidence interval levels and the user behavior shift features in the course of predicting user interest in the campaign program. Inferences 215 representing predicted user interest in the campaign program are accumulated in campaign results 216 and are used to deploy the requested advertising campaign.

Collectively, the feature engineering function 204, periodic data aggregation function 205, training data generation function 208, model training function 209, inference data generation function 214, and inference(s) 215 implement the novel behavior shift-based interest level prediction of the present disclosure. The operations of these components are discussed in further detail below.

In some cases, there are two issues for tune-in prediction on the feature engineering side that can be solved using the present disclosure. First, the system of the present disclosure deals with the cold start problem. A campaign target may represent a new program that will be aired in the future, and user behavior patterns naturally change with new programs. For example, unlike in typical recommendation systems for electronic commerce where user behaviors (purchases) are established on existing products, for ACR data for linear entertainment programs, advertising campaigns are often established for new programs (such as newly-aired programs), for which no prior user behavior exists. Campaigns relating to newly-aired programs therefore create a cold start scenario in the feature engineering step and make using dynamic embedding algorithms, such as an embedding layer to transform behavior data into vectors, difficult. Moreover, as more and more new programs are aired, the program scope in the database increases at a very high speed.

Second, ACR data used for tune-in prediction has a clear temporal pattern. For example, looking at a TV schedule for linear TV programs, there are clear patterns as some programs air only at specific times of the day. For example, sports programs are usually aired during afternoons or evenings. This pattern means that traditional event-based behavior sequence approaches are not an optimal solution for tune-in predictions, because differences in event sequences for daytime and nighttime TV watchers do not necessarily reflect differences in users' interests due to limitations in choices.

To solve these problems, two functions are introduced as a solution in FIG. 2, namely the feature engineering function 204 and the daily data aggregation function 205. Here, user behavior represented by user-program interactions, derived from the database 203, can be mapped into a metadata scope that does not change by the feature engineering function 204. For example, chosen metadata extracted from the data received from the database 203 may include features like program type, program season number, program episode number, program genre, etc. to represent entertainment programs in order to use programs that a user has watched to represent the user's behaviors. In the process implemented by the feature engineering function 204, one or more trained algorithms are used to convert these metadata into vectors. The pipeline between the database 203 and the behavior feature database 207 may support various machine learning algorithms, such as one-hot encoding, natural language processing (like word2vec algorithms), etc. For categorical data like program type, a trained one-hot encoder may be used. For semantic data like program title, a trained word2vec algorithm may be selected. For some numeric data like program season number, the data can be bucketized into categorical data and then one-hot encoding can be applied.

To iron out temporal patterns for ACR data related to user-program interaction behaviors in order to make the behaviors more standardized and comparable with each other, user behavior data can be aggregated on a periodic (such as daily) basis by the periodic data aggregation function 205 and used to generate each user's average daily feature representation. One example aggregation by the periodic data aggregation function 205 may be performed in the following manner $$f_{daily} = \frac{1}{N}(f_{p1} + f_{p2} + \ldots + f_n)$$

Here, $f_{pn}$ represents the $n^{th}$ program that the user watched during a day or other period. For example, if a user only watched two programs at 7:00 μm and 8:00 pm on a specific day, the time-of-day one-hot feature may be aggregated as follows.

7 PM feature:[0,0,0,0,0,0,0,0,0,0,0,0,0,0,0,0,0,0,1,0, 0,0,0]+8 PM feature:[0,0,0,0,0,0,0,0,0,0,0,0,0,0, 0,0,0,0,0,0,1,0,0,0]/2=[0,0,0,0,0,0,0,0,0,0,0,0,0,0,0, 0,0,0,0,0,0.5,0.5,0,0,0]

This aggregation behavior is flexible in order to support other data aggregations in different time windows. For example, a weekly aggregation may be expressed as follows.

$$f_{weekly} = \frac{1}{N_{d1} + N_{d2} + \ldots + N_{d7}}(f_{d1} * N_{d1} + f_{d2} * N_{d2} + \ldots + f_{dn} * N_{d7})$$

Here, $N_{dn}$ represents how many programs this user watched on day n, and $f_{dn}$ represents the $n_{th}$ program that the user watched that day. In this way, daily aggregated behavior features can support feature engineering in different post-processing time windows. The data ETL function 206 collates the output of the sequence formed by the feature engineering function 204 and the periodic data aggregation function 205 for storage in the behavior feature database 207.

In connection with model training, Fibonacci confidence levels on viewer interest can be generated using the training data generation function 208. For tune-in prediction, there may be a need or desire to both (i) predict whether a user has any interest in a campaign program, and (ii) predict the user's interest level in the target program for the campaign. Accurately predicting the user's interest level in the campaign program allows the campaign to be constructed in such a way as to reach desired users more cost-efficiently. A linear entertainment program recommendation is not like other recommendation systems because an entertainment program consumer may have some specific behaviors that can affect campaign results. As noted above, for example, some programs have loyal fans that will tune in to a new season or episode, regardless of whether advertising runs on their devices or not. From a results perspective, these users are already converted, and spending a campaign's budget on those users is not efficient. Therefore, for a tune-in system on linear entertainment, the conversion rate is not the only evaluation parameter that matters to advertisers. In some cases, a lift evaluation that analyzes conversion rate improvements based on A/B testing between different campaign segments may be more important. In some cases, a lift evaluation may be expressed as follows.

$$\text{Lift} = \frac{C_A - C_B}{C_B}$$

Here, $C_A$ represents a conversion ratio for a test group of users that participate in the campaign (receive the advertising), and $C_B$ represents a conversion ratio for a control group that is not exposed to the advertising campaign. For tune-in prediction, advertisers may request or require the system to provide, for example, four different user segments differentiated by interest levels, so that advertising campaigns may be designed in a way that has the best lift performance In some cases, the four different user segments may be referred to as "enthusiast," "fan," "viewer," and "no interest." However, usually in a campaign request, there is no definition for how to judge a user's interest level, which creates a challenge for the system because no label is provided to train a machine learning model.

To help solve this problem, viewership-based Fibonacci confidence interval interest separation can be used for the training data generation function 208. That is, in order to generate interest levels for machine learning model training and prediction purposes, a viewership-based Fibonacci confidence interval interest separation algorithm can be employed. This algorithm categorizes user behavior based on a user's viewership (such as user viewing-to-program time ratio) to create a corresponding Fibonacci interest level (such as one of the interest levels requested from the advertiser, or those described above). In some cases, four Fibonacci confidence intervals may be used in the system for categorization to meet the advertiser's need for four interest levels, although the algorithm here can be easily scaled up or down. In some embodiments, the calculation of the Fibonacci confidence intervals may be based on the following Fibonacci sequences F (0) through F (n).

$$F(0)=0, F(1)=1 \text{ for all } n \geq 2, F(n)=F(n-1)+F(n-2)$$

A first Fibonacci confidence interval may be expressed using $$B_1 = \lim_{n \to \infty} \frac{F(n-1)}{F(n)} = 0.6180,$$

where the first Fibonacci confidence interval is defined as [1, $B_1$). For a specific program, a user's ratio of program viewing time to program length ((viewing time)/(program length)) may fall into this interval, which is labeled "program level 1" for this user. This user is also called an "enthusiast" of this program.

A second Fibonacci confidence interval may be expressed using $$B_2 = \lim_{n \to \infty} \frac{F(n-2)}{F(n)} = 0.3819,$$

where the second Fibonacci confidence interval is defined as [$B_1$, $B_2$). For a specific program, the user's ratio of program viewing time to program length may fall into this interval, which is labeled "program level 2" for this user. This user is also called a "fan" of this program.

A third Fibonacci confidence interval may be expressed using $$B_3 = \lim_{n \to \infty} \frac{F(n-3)}{F(n)} = 0.2360 \text{ or } B_3 = \frac{6 \text{ minutes}}{\text{program length}}.$$

Here, for "program level 3," two different choices are available in this example. The first one uses the Fibonacci confidence interval, while the second one uses a six minute threshold. In some current tune-in systems, six minutes is used based on the advertising definition that less than six minutes of viewing time will be considered as not a tune-in for a program. When the Fibonacci confidence interval is used, the third Fibonacci confidence interval is defined as [$B_2$, $B_3$). When using the six minute threshold, if $B_3$ is larger than $B_2$, $B_3$ can be replaced by $B_2$. In that case, "program level 3" will be removed, and only three interval levels will remain for a program. If $B_3$ is also larger than $B_1$, this program will have only two interval levels. For a specific program, the user's ratio of program viewing time to program length may fall into this interval, which is labeled "program level 3" for this user. This user is also called a "viewer" of this program.

A fourth Fibonacci confidence interval may be expressed using $B_4=0$. For "program level 4," the fourth Fibonacci confidence interval is defined as [$B_3$, $B_4$). This user is also called a "no interest" or a negative user for a program.

In order to support the use of a behavior shift feature space, the training data generation function 208 and the inference data generation function 214 can be used. Using behavior sequences (such as a series of items with which the user interacts) to track changes in user behavior is popular for sequential model structure recommendation systems. However, the dynamic embedding (embedding layer) that is commonly used in these models limits these approaches, which can only construct sequences in this superficial manner because (i) the embedding does not have a specific physical meaning, and (ii) the embedding always changes. By contrast, since embedding in the system of the present disclosure is provided from the behavior feature database 207 with a static scope for each bit, a behavior shift feature space can be designed for user behavior representations. In this space, the user traditional behavior sequence is constructed, and the first derivative (such as changing speed) and second derivative (such as changing acceleration) on the behavior sequence are also introduced to better present the behavior shift properties. In some cases, this can be expressed as follows.

$$F'(t_n) = \frac{F(t_n) - F(t_{n-1})}{t_n - t_{n-1}}$$

$$F''(t_n) = \frac{F'(t_n) - F'(t_{n-1})}{t_n - t_{n-1}}$$

Here, n represents the position count in the behavior sequence, and $t_n$ represents a time difference on the aggregation time scale (such as daily, weekly, monthly, etc.). A user's behavior shift features are determined for training corpora by the training data generation function 208 and supplied, along with the Fibonacci confidence intervals for user interest level, to the model training function 209, which trains the machine learning model for behavior model registration function 211 on that basis.

During use, the target feature engineering function 212 identifies user behaviors of interest based on the campaign request 213. The inference data generation function 214 employs those user behaviors of interest (received from the target feature engineering function 212) and, based on the machine learning model in the behavior model registration function 211 and training data from the training data registration function 210, derives inference data regarding specific users' predicted levels of interest in the advertising campaign's target program, accounting for each user's behavior shift features. The resulting inferences 215 relating to each user may be used to selectively deploy the advertising campaign effectively and cost-efficiently.

Although FIG. 2 illustrates one example of a system 200 for behavior shift-based interest level prediction, various changes may be made to FIG. 2. For example, various components or functions in FIG. 2 may be combined, further subdivided, replicated, rearranged, or omitted according to particular needs. Also, one or more additional components or functions may be included if needed or desired.

Figure 3:
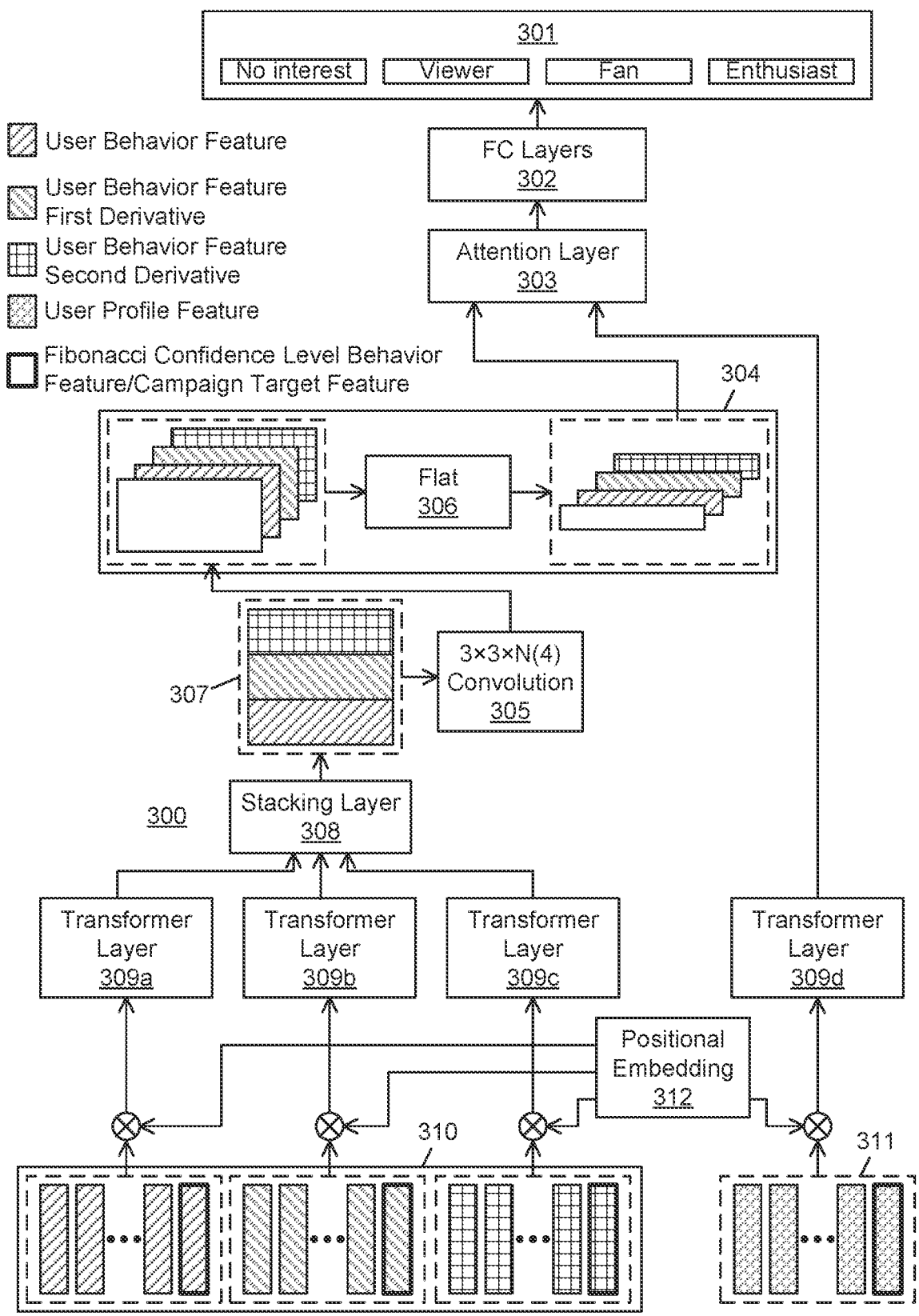
FIGS. 3 and 3A illustrate an alternate example behavior to interest level semantic transfer model for behavior shift-based interest level prediction in accordance with this disclosure.
Figure 3A:
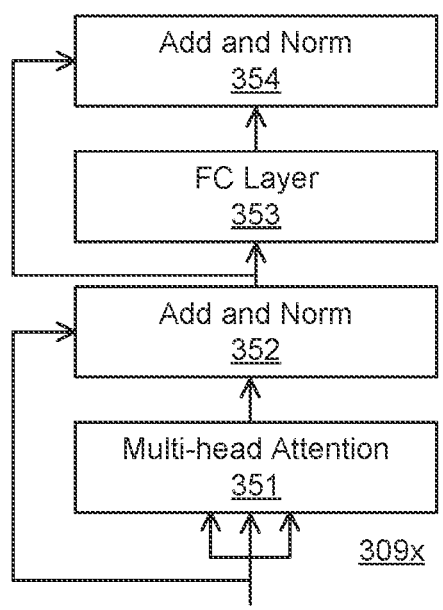

FIGS. 3 and 3A illustrate an alternate example behavior to interest level semantic transfer model 300 for behavior shift-based interest level prediction in accordance with this disclosure. For ease of explanation, the model 300 shown in FIG. 3 is described as being implemented for use with the system 200 of FIG. 2. However, the model 300 shown in FIG. 3 could be used with any other suitable system(s).

As shown in FIG. 3, the model 300 includes a Fibonacci interest level prediction layer 301, which uses the four interest levels (enthusiast, fan, viewer, and no interest) described above to classify consumers of linear entertainment programming A Fibonacci confidence (FC) layer 302 indicates the interest level for a particular consumer based on outputs from an attention layer 303. The attention layer 303 receives inputs from a Fibonacci confidence interval semantic space 304, which receives information relating to the Fibonacci confidence interval from a convolution function 305. The information received by the Fibonacci confidence interval semantic space 304 may include, for each feature, information regarding a user behavior feature (left-slanted cross-hatching), the first derivative of the user behavior feature information (right-slanted cross-hatching), and the second derivative of the user behavior information (horizontal and vertical cross-hatching). The information relating to the Fibonacci confidence interval received by the Fibonacci confidence interval semantic space 304 from the convolution function 305 is flattened by a function 306, and the flattened data represents the inputs to the attention layer 303. In this example, the convolution function 305 has a size of 3×3×N, where N is the number of Fibonacci confidence interval levels (such as four in the example described above).

The convolution function 305 receives inputs from a behavior shifting semantic space 307. The behavior shifting semantic space 307 receives information regarding user behavior shifting from a stacking layer 308, where this information includes the information regarding a user behavior feature, the first derivative of the user behavior feature information, and the second derivative of the user behavior feature information. The stacking layer 308 receives inputs from transformer layers 309a-309c, each of which operates on inputs relating respectively to the information regarding the user behavior feature, the first derivative of the user behavior feature information, and the second derivative of the user behavior feature information. The transformer layers 309a-309c operate on data originating from a behavior shifting feature space 310. A fourth transformer layer 309d operates on user profile features (left-slanted and right-slanted cross-hatching) originating from a user profile feature space 311. The data on which the transformer layers 309a-309d operate is influenced by a positional embedding 312. In FIG. 3, the campaign target features are indicated by heavy outlining and include one or more features from the user profile feature space 311 and the information regarding the user behavior feature(s), the first derivative of the user behavior feature(s) information, and the second derivative of the user behavior feature(s) information from the behavior shifting feature space 310.

FIG. 3A illustrates in greater detail the structure of the transformer layers 309a-309d. Each transformer layer 309x includes a multi-head attention 351, the output of which is received by an addition and normalization layer 352 (which also receives the input to the multi-head attention 351). The output of the layer 352 is received by an FC layer 353. Both the output and the input of FC layer 353 are received by an addition and normalization layer 354, the output of which is the output for the transformer layer 309x.

In some cases, the feature data used in the present disclosure includes the following information.

| User Behavior Feature/ Campaign Target Feature | User Profile Feature |
|---|---|
| 1. Season number | 1. Time of day |
| 2. Episode number | 2. Program watching length |
| 3. Production year | 3. Program watching percentage |
| 4. Program length | 4. Geographic |
| 5. Program title | 5. Day of week |
| 6. Program genre | |
| 7. Program type | |

In the behavior shift feature space, all three feature sequences (user behavior sequence, user behavior sequence first derivative, and user behavior sequence second derivative) can have the same length. In one example model, eight features are chosen, and all features may come from the behavior feature database 207. In some cases, post-processing may be applied as follows. The first seven features in each sequence may use only a positive program as defined by the advertiser (for a user's program viewership time greater than 6 minutes). In the training stage, an eighth feature will be where the program falls in a specific Fibonacci confidence interval for this user. The training label for each input data may be the same as the Fibonacci confidence level for the eighth feature. In the inference stage, the first seven features may not change, and the eighth feature may be replaced by the campaign target feature that is generated from the target feature engineering function 212. All eight features in each feature sequence can be aggregated features and support flexible aggregation (such as daily, weekly, monthly, etc.). With respect to a user profile feature sequence, the user profile feature sequence may represent a seven feature sequence corresponding to first seven features in the behavior shift feature space.

In some cases, the tasks to be completed by a machine learning model can include the following. The machine learning model can take features from the behavior shift feature space and add a positional embedding for each behavior sequence. One or more of the transformer layers can help to learn a deeper representation of each behavior sequence. Multiple transformer outputs from the behavior shift feature space (such as three outputs) can be stacked to create a learned two-dimensional behavior shift semantic space. A convolution layer, such as one with a kernel size of 3×3×4, can be used to transform the two-dimensional behavior shift semantic space into a three-dimensional Fibonacci confidence interval level semantic space. A three-dimensional Fibonacci confidence interval level semantic feature is flattened and goes through the attention layer with a learned deeper user profile feature from the transformer (from the user profile feature sequential data). Two or more fully-connected layers can map the output of the attention layer into a final classification layer that predicts the Fibonacci interest level as defined above.

In some cases, the tune-in prediction process can be designed in a way to utilize more offline work to boost its speed and throughput. For example, the machine learning model may represent a deep learning model or other model that is very generic, meaning the model does not need campaign information to be trained. This generic model makes it possible to move all of the heavy lifting parts in the system, such as most feature engineering and model training, into offline processing and can be scheduled automatically. This saves a large amount of time and can help advertising teams get necessary segments as soon as possible. With the system design described, an advertising team can support more campaigns daily. The online part of the tune-in prediction process may only need to run light feature engineering for proxy shows from an advertiser's campaign request. To get a final segment, the machine learning model can simply replace the Fibonacci confidence level behavior feature in the behavior shift feature space with corresponding proxy show features to perform inferencing. Inferencing can be performed on different cluster nodes, leveraging parallel computing to achieve faster speed.

Although FIGS. 3 and 3A illustrate one alternate example of a behavior to interest level semantic transfer model 300 for behavior shift-based interest level prediction, various changes may be made to FIGS. 3 and 3A. For example, various components or functions in FIGS. 3 and 3A may be combined, further subdivided, replicated, rearranged, or omitted according to particular needs. Also, one or more additional components or functions may be included if needed or desired.

Figure 4:
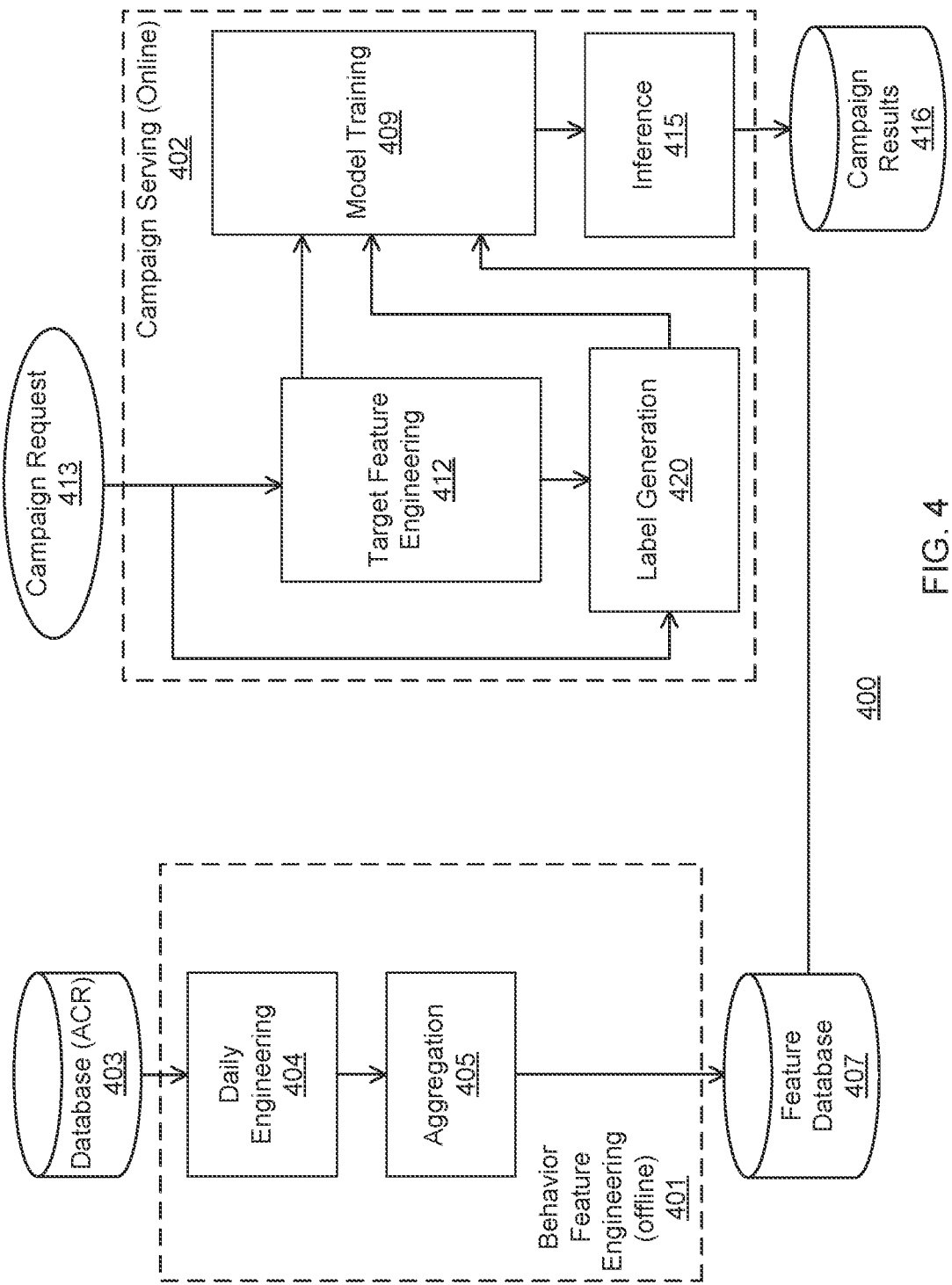
FIG. 4 illustrates another example system for behavior shift-based interest level prediction in accordance with this disclosure.
Figure 5:
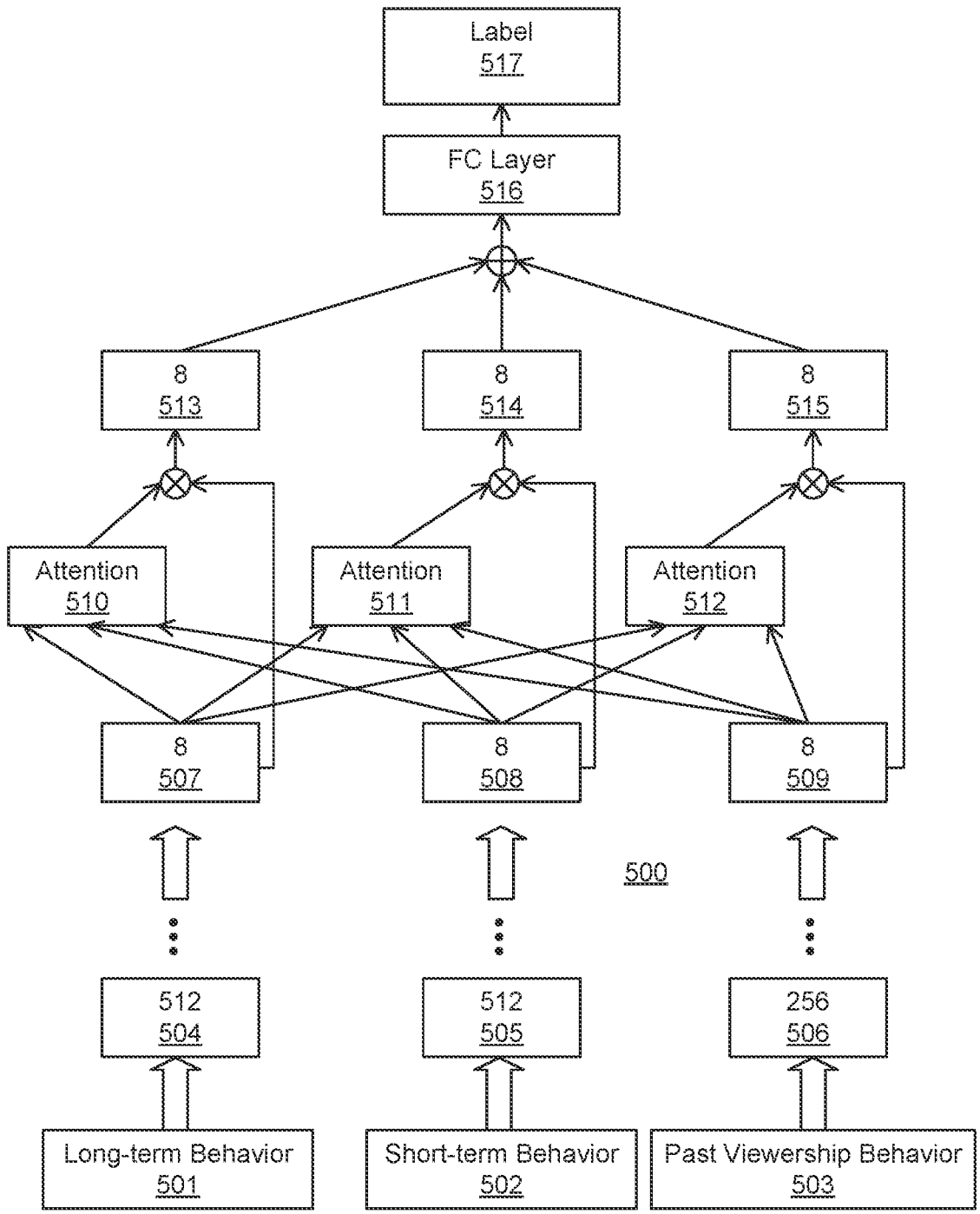
FIG. 5 illustrates an example model for behavior shift-based interest level prediction for use with the system of FIG. 4 in accordance with this disclosure.

FIG. 4 illustrates another example system 400 for behavior shift-based interest level prediction in accordance with this disclosure, and FIG. 5 illustrates an example model 500 for behavior shift-based interest level prediction for use with the system 400 of FIG. 4 in accordance with this disclosure. In some specific campaign requests, an advertiser can provide information on user interest levels for campaign targets according to the previous user behavior. This happens more often when an advertiser runs a "return show" campaign. A return show campaign usually means that the campaign target is a new season of an existing show. For example, the campaign target may be the new season for the series show "Young Sheldon" for which several seasons have aired previously. In this case, an alternative system 400 as illustrated by FIGS. 4 and 5 may be utilized.

Similar to the system 200 in FIG. 2, the system 400 includes an offline analysis subsystem (including a behavior feature engineering function 401) and an online analysis subsystem (including a campaign serving function 402). The behavior feature engineering function 401 includes a daily engineering function 404 (analogous to the feature engineering function 204) that receives information from a database 403 and provides an output to an aggregation function 405 (analogous to the periodic data aggregation function 205). The output of the aggregation function 405 is stored in a feature database 407. In the embodiment of FIG. 4, offline behavior feature engineering is still provided as in the embodiment of FIG. 2. However, in this embodiment, model training is moved online because labels (interest levels) are campaign-specific.

The campaign serving function 402 receives a campaign request 413 at each of a target feature engineering function 412 and a label generation function 420, where the label generation function 420 also receives the output of the target feature engineering function 412. Outputs from the target feature engineering function 412 and the label generation function 420 are also supplied, together with information from the feature database 407, to a model training function 409. The model training function 409 produces an inference 415, which becomes part of campaign results 416.

In order to boost the speed of the online analysis subsystem, a light attention-based model 500 is employed. In the model 500, the time window used for the behavior sequence data is six weeks. The first four weeks are aggregated together for use as a long-term behavior 501, while the last two weeks are used as a short-term behavior 502. A past viewership behavior 503 is also utilized. In the example shown, feature sets 504-506 from each of the long-term behavior 501, the short-term behavior 502, and the past viewership behavior 503 are reduced to smaller sets 507-509, respectively, and respectively supplied to attention layers 510-512. The outputs of the attention layers 510-512 are combined with the feature sets 507-509 to produce feature sets 513-515. Those feature sets 513-515 are supplied to an FC layer 516, which outputs a label 517.

Although FIG. 4 illustrates another example of a system 400 for behavior shift-based interest level prediction and FIG. 5 illustrates one example of a model 500 for behavior shift-based interest level prediction for use with the system 400 of FIG. 4, various changes may be made to FIGS. 4 and 5. For example, various components or functions in FIGS. 4 and 5 may be combined, further subdivided, replicated, rearranged, or omitted according to particular needs. Also, one or more additional components or functions may be included if needed or desired.

Figure 6:
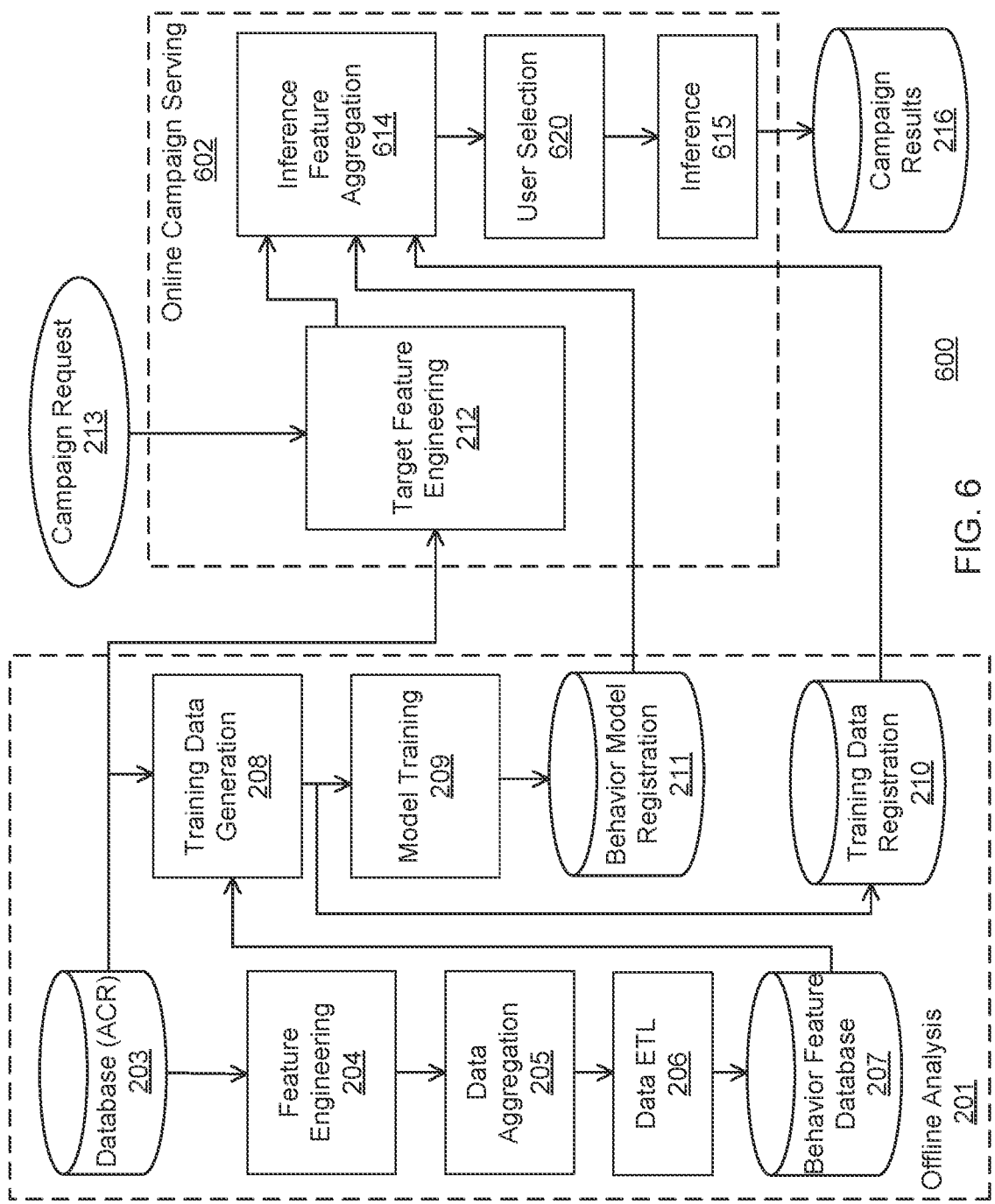
FIG. 6 illustrates still another example system for behavior shift-based interest level prediction in accordance with this disclosure.
Figure 7:
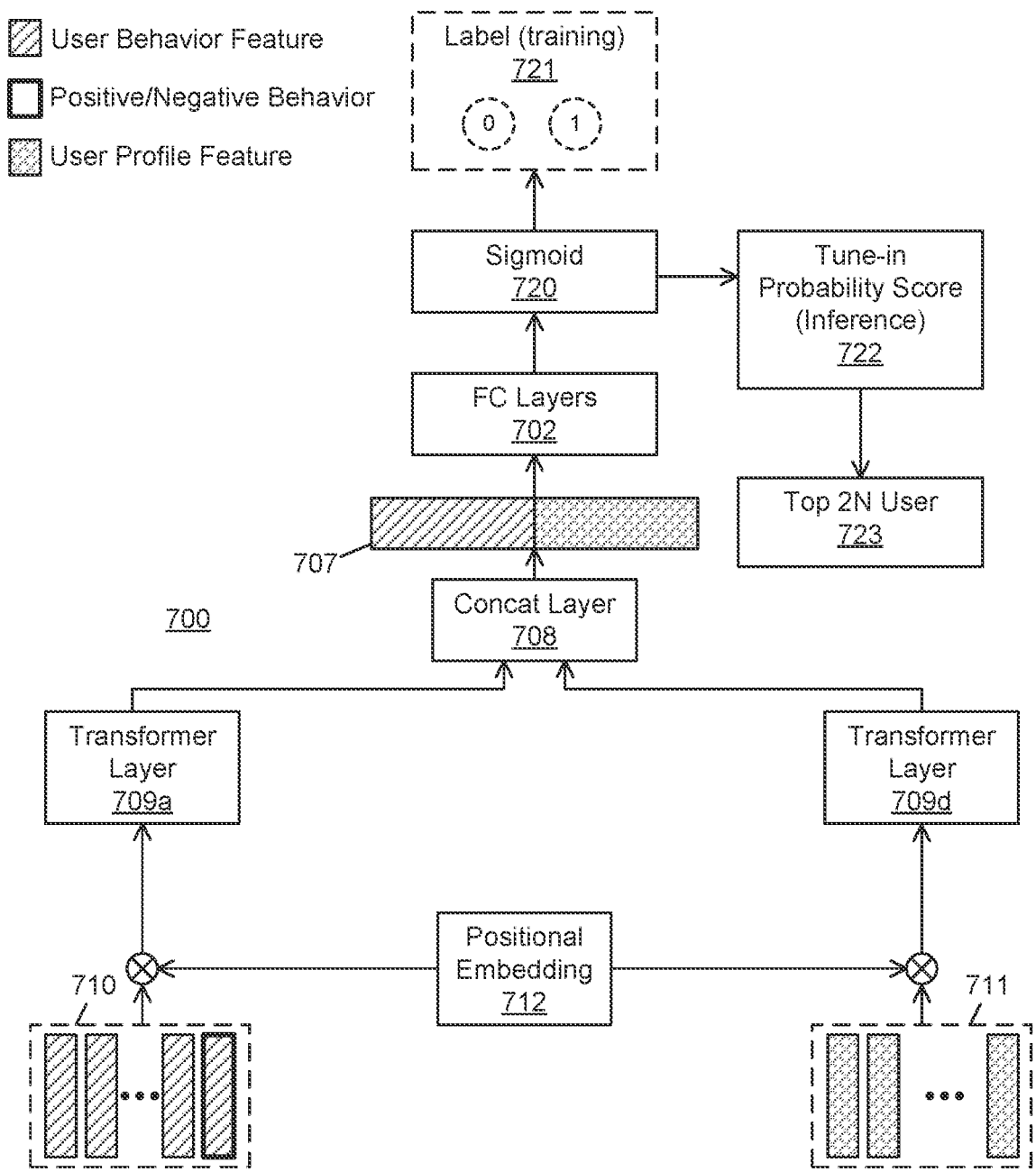
FIG. 7 illustrates an example model for behavior shift-based interest level prediction for use with the system of FIG. 6 in accordance with this disclosure.

FIG. 6 illustrates still another example system 600 for behavior shift-based interest level prediction in accordance with this disclosure, and FIG. 7 illustrates an example model 700 for behavior shift-based interest level prediction for use with the system 600 of FIG. 6. The system 600, while similar to the system 200, provides a faster pipeline. In the faster pipeline, a user selection model 700 is added to reduce the data size for inferencing. In an online campaign serving subsystem 602, the inference data generation function 214 is replaced with an inference feature aggregation function 614 and a user selection function 620, which collectively produce an inference 615. The inference feature aggregation function 614 aggregates the limited user behavior features used for tune-in prediction for the campaign program. The user selection function 620 employs the limited user behavior features and the Fibonacci confidence interval level to generate a binary (such as "0" or "1") score predicting a user's tune-in probability for the campaign program.

The user selection model 700 uses a smaller transformer-based model as a ranking model structure as shown in FIG. 7. In the model 700, a user behavior feature space 710 does not include the first and second derivatives as in the model 300. While a specific user behavior feature (such as indicated by heavy outlining in FIG. 7) may be the object of positive or negative user behavior, user profile features 711 are typically not. A positional embedding 712 influences the data on which transformer layers 709a-709d operate. A concatenation layer 708 receives outputs of the transformer layers 709a-709d and forms concatenated features 707, which are processed by FC layers 702. A sigmoid function 720 operates on outputs of the FC layers 702 and produces at least one of a label 721 (during training) or a tune-in probability score 722 (during inferencing). The sigmoid function 720 produces a two-class classification of users, based on the user behavior features and the associated Fibonacci confidence interval levels, for the tune-in probability score 722. A top 2N user 723 (where N is the segment size from the campaign request) may be derived from the tune-in probability score 722. The model 700 here may reduce the number of users going through the inference block, such as from around 25 million times the final segment size (all interest levels together) to two times the final segment size specified in the campaign request.

Although FIG. 6 illustrates still another example of a system 600 for behavior shift-based interest level prediction and FIG. 7 illustrates one example of a model 700 for behavior shift-based interest level prediction for use with the system 600, various changes may be made to FIGS. 6 and 7. For example, various components or functions in FIGS. 6 and 7 may be combined, further subdivided, replicated, rearranged, or omitted according to particular needs. Also, one or more additional components or functions may be included if needed or desired.

It should be noted that the functions shown in or described with respect to FIGS. 2 through 7 can be implemented in an electronic device 101, server 106, or other device(s) in any suitable manner. For example, in some embodiments, at least some of the functions shown in or described with respect to FIGS. 2 through 7 can be implemented or supported using one or more software applications or other software instructions that are executed by the processor 120 of the electronic device 101, server 106, or other device(s). In other embodiments, at least some of the functions shown in or described with respect to FIGS. 2 through 7 can be implemented or supported using dedicated hardware components. In general, the functions shown in or described with respect to FIGS. 2 through 7 can be performed using any suitable hardware or any suitable combination of hardware and software/firmware instructions.

Figure 8:
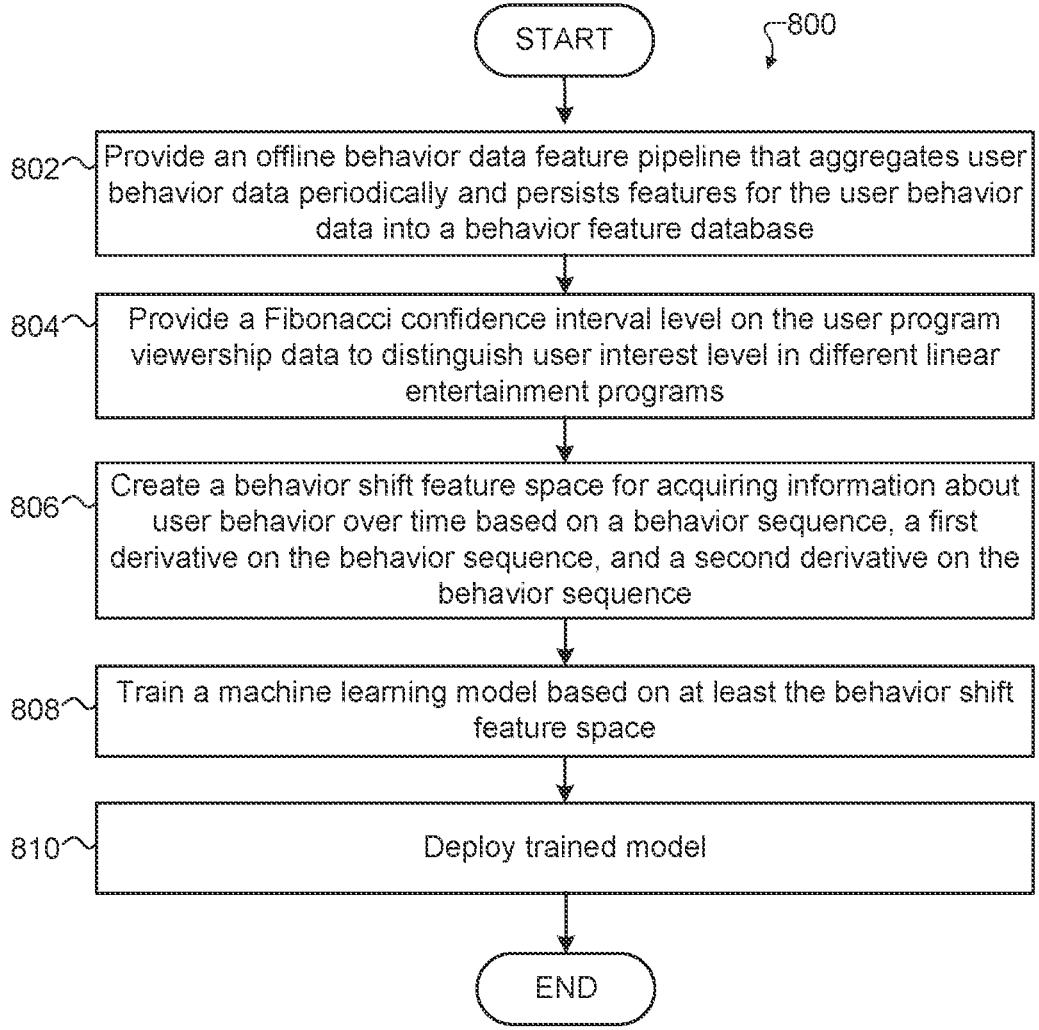
FIG. 8 illustrates an example method for training a machine learning model in accordance with this disclosure.

FIG. 8 illustrates an example method 800 for training a machine learning model in accordance with this disclosure. For ease of explanation, the method 800 is described with reference to the system 200 and the model 300. However, the method 800 may be employed with any suitable system and model and may be readily modified to accommodate variations in the underlying system and/or model.

As shown in FIG. 8, an offline behavior data feature pipeline (such as the feature engineering function 204, periodic data aggregation function 205, and data ETL function 206 from FIG. 2) that aggregates user behavior data (such as daily) and persists features for the user behavior data into a behavior feature database (such as the behavior feature database 207 in FIG. 2) is provided (step 802). The offline behavior data feature pipeline may map linear entertainment programs into a predefined feature space and may transfer raw behavior data into vectorized features using trained algorithms and with periodic sessionization. A Fibonacci confidence interval level is provided on the aggregated user program viewership data (such as by the training data generation function 208 in FIG. 2) to distinguish user interest level in different linear entertainment programs (step 804). The Fibonacci confidence interval level may be based on conversion rate improvement in user program viewership data for a linear entertainment program. A behavior shift feature space is created (such as also by the training data generation function 208) for acquiring information about user behavior over time based on a behavior sequence, a first derivative of the behavior sequence, and a second derivative of the behavior sequence (step 806). A machine learning model (such as that of the behavior model registration function 211 in FIG. 2) is trained based on at least the behavior shift feature space (step 808) and deployed (step 810). In some embodiments, the machine learning model is trained offline.

Although FIG. 8 illustrates one example of a method 800 for training a machine learning model, various changes may be made to FIG. 8. For example, while shown as a series of steps, various steps in FIG. 8 may overlap, occur in parallel, occur in a different order, or occur any number of times.

Figure 9:
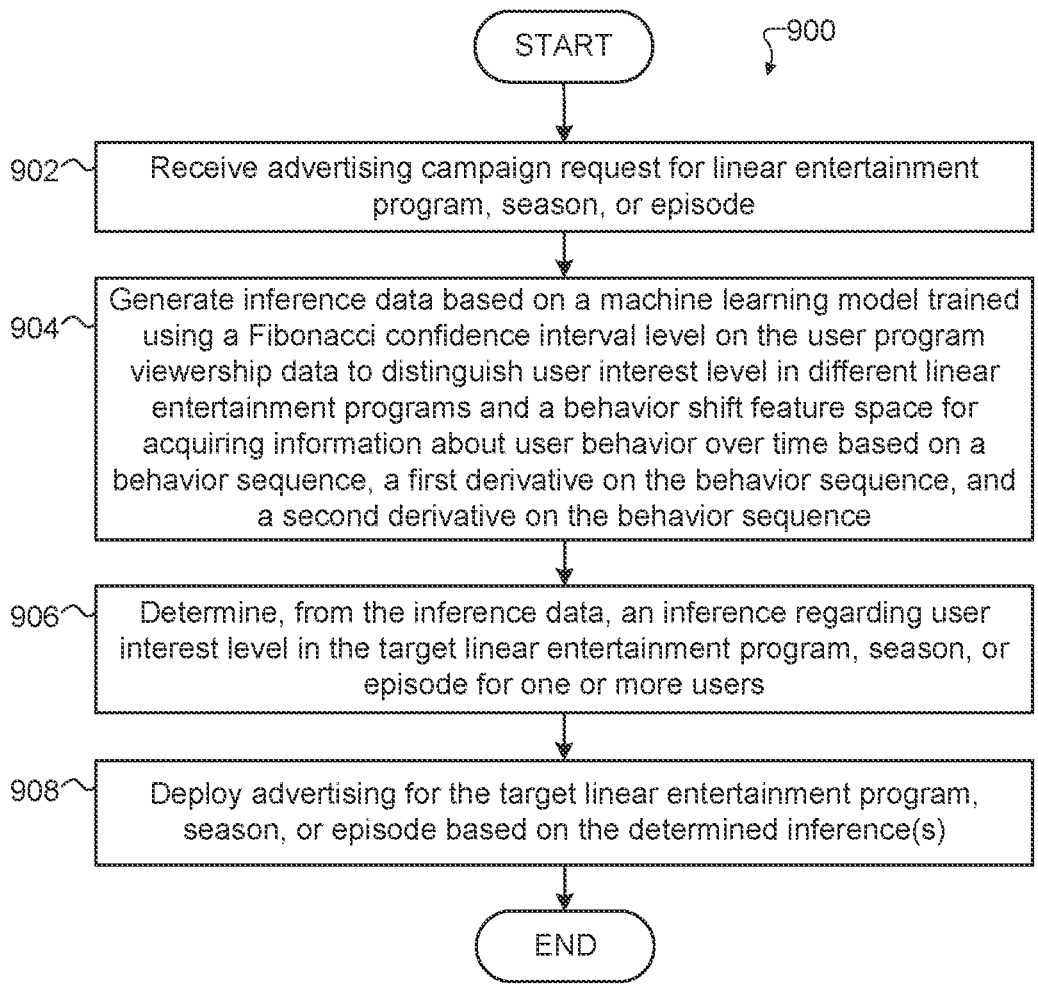
FIG. 9 illustrates an example method for using a trained machine learning model in accordance with this disclosure.

FIG. 9 illustrates an example method 900 for using a trained machine learning model in accordance with this disclosure. For ease of explanation, the method 900 is described with reference to the system 200 and the model 300. However, the method 900 may be employed with any suitable system and model and may be readily modified to accommodate variations in the underlying system and/or model.

As shown in FIG. 9, an advertising campaign request (such as the campaign request 213 in FIG. 2) for a target linear entertainment program, season, or episode is received (step 902). Inference data is generated (such as by the inference data generation function 214 in FIG. 2) based on a machine learning model (such as that of the behavior model registration function 211 in FIG. 2) trained using a Fibonacci confidence interval level on user program viewership data to distinguish user interest level in different linear entertainment programs and a behavior shift feature space for acquiring information about user behavior over time based on a behavior sequence, a first derivative on the behavior sequence, and a second derivative on the behavior sequence (step 904). From the inference data, an inference (such as an inference 215) is determined for one or more users regarding their user interest level in a target linear entertainment program, season, or episode (step 906). Using the determined inference(s), advertising for the target linear entertainment program, season, or episode is deployed (step 908).

Although FIG. 9 illustrates one example of a method 900 for using a trained machine learning model, various changes may be made to FIG. 9. For example, while shown as a series of steps, various steps in FIG. 9 may overlap, occur in parallel, occur in a different order, or occur any number of times.

Overall, the systems and methods of the present disclosure may be used to generate audience segments in production level campaigns. In some embodiments, this can be done in the following areas: tune-in prediction, brand interest level analysis, society interest shift analysis, user clustering, and cross-device behavior analysis. Tune-in prediction generally involves helping television or other advertisers find users' interest levels in shows to be promoted, and brand interest level analysis generally involves helping brand owners identify users' interest levels in branded products so that ads can run on those users' devices to promote the products. Society interest shift analysis generally involves analyzing a large group of users' behavior data (such as television or smartphone users) to identify a trend shift in current society, which can provide very helpful data for business analysis, such as by helping fashion businesses decide what new trends are. User clustering generally involves clustering similar users together. In some cases, for instance, advertisers have seed users that are believed to be very interested in specific products or content. By providing user clusters for comparison with the seed users, a seed segment can be optimized or enlarged to increase user reach. Cross-device behavior analysis generally involves analyzing user cross-device behaviors. For example, an analysis of user behaviors involving televisions, smartphones, computers, and Internet of Things (IoT) devices can collectively provide flexibility to adapt to the features described above and create more accurate analysis by obtaining and processing more data.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
providing user program viewership data for each of a plurality of users for a plurality of linear entertainment programs;
creating a behavior shift feature space for acquiring user interest information corresponding to user program viewership behavior over time for the plurality of linear entertainment programs, the behavior shift feature space based on a viewership behavior sequence for each user among the plurality of users, a first derivative on each of the viewership behavior sequences, and a second derivative on each of the viewership behavior sequences;
utilizing a trained machine learning model including a plurality of transformer layers and an attention layer to map user data from the behavior shift feature space into a prediction of a Fibonacci confidence interval level of user interest in a linear entertainment program, season, or episode for each user of the plurality of users, wherein the plurality of transformer layers includes a transformer layer for each of the viewership behavior sequences, the first derivatives on the viewership behavior sequences, and the second derivatives on the viewership behavior sequences, wherein the transformer layers for the viewership behavior sequences, the first derivatives on the viewership behavior sequences, and the second derivatives on the viewership behavior sequences provide outputs to the attention layer through a convolution function, and wherein an additional transformer layer for user profile features for the plurality of users provides additional outputs to the attention layer; and
controlling deployment of an advertising campaign for the linear entertainment program, season, or episode to the plurality of users based on the Fibonacci confidence interval level for each user of the plurality of users.

2. The method of claim 1, further comprising:
providing an offline behavior data feature pipeline that aggregates the user program viewership behavior for the plurality of linear entertainment programs and persists features for the user program viewership behavior into a behavior feature database.

3. The method of claim 2, wherein the offline behavior data feature pipeline transfers raw behavior data into vectorized features using one or more trained algorithms and with periodic sessionization.

4. The method of claim 3, wherein the offline behavior data feature pipeline maps the plurality of linear entertainment programs into predefined feature spaces.

5. The method of claim 1, wherein the Fibonacci confidence interval level is based on conversion rate improvement in the user program viewership data for at least one of the linear entertainment programs.

6. The method of claim 1, wherein the trained machine learning model is trained offline.

7. The method of claim 1, wherein the trained machine learning model is a user selection model.

8. An apparatus comprising:
at least one processing device configured to:
provide user program viewership data for each of a plurality of users for a plurality of linear entertainment programs;
create a behavior shift feature space for acquiring user interest information corresponding to user program viewership behavior over time for the plurality of linear entertainment programs, the behavior shift feature space based on a viewership behavior sequence for each user among the plurality of users, a first derivative on each of the viewership behavior sequences, and a second derivative on each of the viewership behavior sequences;
utilize a trained machine learning model including a plurality of transformer layers and an attention layer to map user data from the behavior shift feature space into a prediction of a Fibonacci confidence interval level of user interest in a linear entertainment program, season, or episode for each user of the plurality of users, wherein the plurality of transformer layers includes a transformer layer for each of the viewership behavior sequences, the first derivatives on the viewership behavior sequences, and the second derivatives on the viewership behavior sequences, wherein the transformer layers for the viewership behavior sequences, the first derivatives on the viewership behavior sequences, and the second derivatives on the viewership behavior sequences are configured to provide outputs to the attention layer through a convolution function, and wherein an additional transformer layer for user profile features for the plurality of users is configured to provide additional outputs to the attention layer; and
control deployment of an advertising campaign for the linear entertainment program, season, or episode to the plurality of users based on the Fibonacci confidence interval level for each user of the plurality of users.

9. The apparatus of claim 8, wherein the at least one processing device is further configured to provide an offline behavior data feature pipeline that aggregates the user program viewership behavior for the plurality of linear entertainment programs and persists features for the user program viewership behavior into a behavior feature database.

10. The apparatus of claim 9, wherein the offline behavior data feature pipeline is configured to transfer raw behavior data into vectorized features using one or more trained algorithms and with periodic sessionization.

11. The apparatus of claim 10, wherein the offline behavior data feature pipeline is configured to map the plurality of linear entertainment programs into predefined feature spaces.

12. The apparatus of claim 8, wherein the Fibonacci confidence interval level is based on conversion rate improvement in the user program viewership data for at least one of the linear entertainment programs.

13. The apparatus of claim 8, wherein the trained machine learning model is trained offline.

14. The apparatus of claim 8, wherein the trained machine learning model is a user selection model.

15. A non-transitory computer readable medium containing instructions that when executed cause at least one processor to:
provide user program viewership data for each of a plurality of users for a plurality of linear entertainment programs;

create a behavior shift feature space for acquiring user interest information corresponding to user program viewership behavior over time for the plurality of linear entertainment programs, the behavior shift feature space based on a viewership behavior sequence for each user among the plurality of users, a first derivative on each of the viewership behavior sequences, and a second derivative on each of the viewership behavior sequences;

utilize a trained machine learning model including a plurality of transformer layers and an attention layer to map user data from the behavior shift feature space into a prediction of a Fibonacci confidence interval level of user interest in a linear entertainment program, season, or episode for each user of the plurality of users, wherein the plurality of transformer layers includes a transformer layer for each of the viewership behavior sequences, the first derivatives on the viewership behavior sequences, and the second derivatives on the viewership behavior sequences, wherein the transformer layers for the viewership behavior sequences, the first derivatives on the viewership behavior sequences, and the second derivatives on the viewership behavior sequences are configured to provide outputs to the attention layer through a convolution function, and wherein an additional transformer layer for user profile features for the plurality of users is configured to provide additional outputs to the attention layer; and control deployment of an advertising campaign for the linear entertainment program, season, or episode to the plurality of users based on the Fibonacci confidence interval level for each user of the plurality of users.

16. The non-transitory computer readable medium of claim 15, wherein the instructions when executed further cause the at least one processor to provide an offline behavior data feature pipeline that is configured to aggregate the user program viewership behavior for the plurality of linear entertainment programs and persist features for the user program viewership behavior into a behavior feature database.

17. The non-transitory computer readable medium of claim 16, wherein the instructions when executed further cause the at least one processor to configure the offline behavior data feature pipeline to transfer raw behavior data into vectorized features using one or more trained algorithms and with periodic sessionization.

18. The non-transitory computer readable medium of claim 17, wherein the instructions when executed further cause the at least one processor to configure the offline behavior data feature pipeline to map the plurality of linear entertainment programs into predefined feature spaces.

19. The non-transitory computer readable medium of claim 15, wherein the Fibonacci confidence interval level is based on conversion rate improvement in the user program viewership data for at least one of the linear entertainment programs.

20. The non-transitory computer readable medium of claim 15, wherein the trained machine learning model is trained offline.

21. A method comprising:
receiving an advertising campaign request relating to a target linear entertainment program, season, or episode;
generating inference data based on a machine learning model including a plurality of transformer layers and an attention layer, wherein the plurality of transformer layers includes a transformer layer for a viewership behavior sequence for each user among a plurality of users, a first derivative on each viewership behavior sequence, and a second derivative on each viewership behavior sequence, wherein the transformer layers for the viewership behavior sequence, the first derivatives on the viewership behavior sequences, and the second derivatives on the viewership behavior sequences provide outputs to the attention layer through a convolution function, and wherein an additional transformer layer for user profile features for the plurality of users provides additional outputs to the attention layer, the machine learning model trained using:
user program viewership data for each of the plurality of users for a plurality of linear entertainment programs; and
a behavior shift feature space for acquiring user interest information corresponding to user program viewership behavior over time for the plurality of linear entertainment programs, the behavior shift feature space based on the viewership behavior sequences, the first derivatives on the viewership behavior sequences, and the second derivatives on the viewership behavior sequences; and
determining, from the inference data, a prediction of a Fibonacci confidence interval level of user interest level in the target linear entertainment program, season, or episode for each user of the plurality of users.

22. The method of claim 21, further comprising:
based on the inference data, deploying advertising for the target linear entertainment program, season, or episode to at least some of the plurality of users according to the prediction of the Fibonacci confidence interval level of user interest level.

23. The method of claim 21, wherein the machine learning model is trained offline.

24. The method of claim 21, wherein the machine learning model is trained based on a behavior data feature pipeline that maps the plurality of linear entertainment programs into predefined feature spaces.

25. The method of claim 21, wherein the machine learning model is trained based on raw behavior data transferred into vectorized features using one or more trained algorithms and with periodic sessionization.

26. The method of claim 21, wherein the machine learning model is trained based on periodic aggregation of the user program viewership behavior with persistence of features for the user program viewership behavior into a behavior feature database.

27. The method of claim 21, wherein the Fibonacci confidence interval level is based on conversion rate improvement in the user program viewership data for at least one of the plurality of linear entertainment programs.

* * * * *